Oct. 6, 1953 — J. T. RUIST — 2,654,645
SHEET METAL PILLOW BLOCK
Filed Dec. 15, 1949
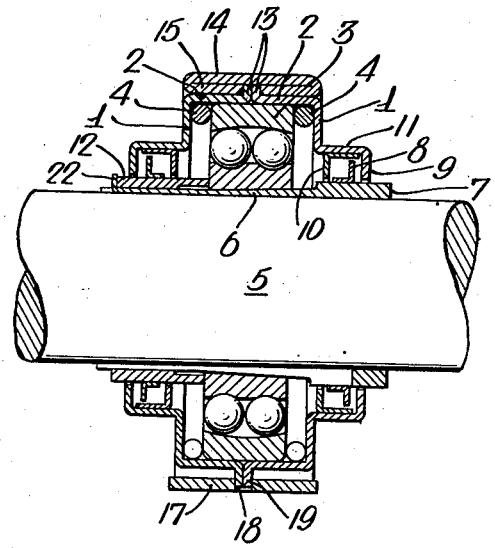
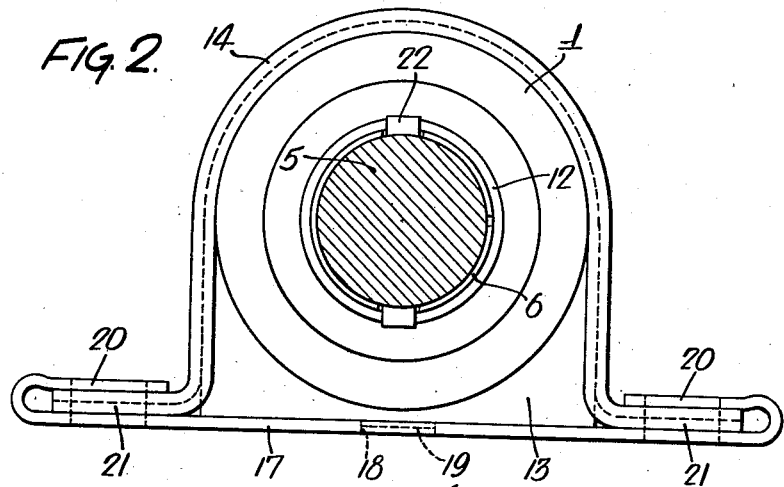
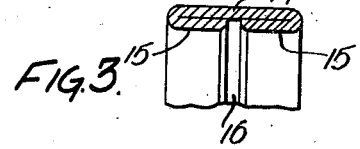
Inventor:
John Ture Ruist
by his Attorneys
Howson & Howson Patented Oct. 6, 1953

2,654,645

UNITED STATES PATENT OFFICE 2,654,645

SHEET METAL PILLOW BLOCK

John Ture Ruist, Goteborg, Sweden, assignor to Aktiebolaget Svenska Kullagerfabriken, Goteborg, Sweden, a corporation of Sweden Application December 15, 1949, Serial No. 133,033
In Sweden December 22, 1948

3 Claims. (Cl. 308—189)

The present invention relates to sheet metal pillow blocks for rolling bearings of the type comprising a pair of housing halves having outwardly directed flanges, which are engaged by a yoke circumferentially embracing the halves and holding them together and also having a base plate which is connected to the other parts when the block is fixed in position.

The pillow block described above is simple and inexpensive and functions very satisfactorily, but has the disadvantage that the parts are not held together until the pillow block has been fixed in position. For this reason special provisions must be made, such as tieing them together to keep them together during handling until they have been mounted.

The present invention has for its purpose to provide a device in which the parts will be retained in assembled relationship so that they may be handled as a unit immediately after they are assembled in the factory and before they are fixed in position.

One form of the invention applied to a pillow block for a ball bearing mounted on an adapter sleeve is shown on the accompanying drawing in which Fig. 1 is a section along an axial plane and Fig. 2 is a side view of the housing. Fig. 3 is a section through a portion of the yoke.

The housing comprises two similar halves 1, each having a cylindrical portion 2, the inner surfaces of which fit a ball bearing 3. The combined width of the portions 2 is greater than the width of the bearing in order to permit of a certain amount of axial displacement of the bearing if required. When the position of the bearing is to be fixed a pair of rings 4 is introduced between the side faces of the bearing and the halves of the bearing housing.

The bearing is fixed to the shaft 5 by means of a taper sleeve 6, one end of which has a thicker cylindrical portion 7 on which a sealing ring 8 is mounted. The portion 7 forms a seal together with the annular edge 9 of the housing and a sealing ring 10 disposed within a cylindrical portion 11 of the housing having a smaller diameter than the above mentioned cylindrical portion 2. A ring 12 is mounted on the other end of the taper sleeve. The external surface of the ring is cylindrical and is of the same diameter as the cylindrical portion 7. This ring forms a seal together with other sealing rings 8 and 10. The sleeve 12 is retained in position after assembly by bending up two tongues 22 on the sleeve 6.

The halves 1 of the housing are each provided with a flange 13 extending outwardly. A yoke 14 is located over the halves of the housing and serves to hold them together and to fix the housing to a support. In the form shown the yoke is made from a band, the sides 15 of which have been bent back so that a channel 16 having a width corresponding to the combined thickness of the flanges is formed between the edges. When the yoke is fitted over the halves the flanges 13 enter the channel 16 so that the halves are held together along their edges with the exception of their lower straight edges.

The base plate 17 is provided with a slit 18 into which projections 19 on the flanges 13 fit. The ends 20 of the base plate are bent back so that they embrace the feet 21 of the yoke 14.

When assembling the block the two halves 1 with the bearing 3, the sealing rings 8 and 10 and rings 4 if any are assembled after which the yoke 14 is pushed over the housing. The base plate 17 is then mounted sideways over the feet 21 of the yoke. During this operation the base plate must be sprung somewhat in order to pass the projections. However, as soon as the base plate is in its correct position, it springs back so that the projections enter the slit 18. The entire pillow block is thus held together.

Having thus described my invention I claim and desire to secure the following by Letters Patent:

1. A sheet metal pillow block for rolling bearings and the like, comprising a pair of housing halves engaging each other in a plane perpendicular to the axis of the bearing, the meeting edges of the halves being turned outwardly to form flanges, a yoke circumferentially embracing the halves and having a groove for receiving said flanges, the ends of said yoke being bent outwardly to form feet, a base plate, the ends of said base plate being bent backwards to embrace the ends of the said feet so as to interlock the base plate with the housing against separation in the said perpendicular plane, and means for detachably interlocking the base plate with the housing against relative displacement in the axial direction, said interlocking means comprising a tongue on one of said interlocked members and a tongue receiving socket on the other of said interlocked members engageable and disengageable with and from each other by flexure of said plate, and said base plate having sufficient flexibility in the area between said feet to provide for said engagement and disengagement.

2. A pillow block according to claim 1 wherein each of the housing flanges is provided with a depending tongue, and the base plate is apertured intermediate said feet for reception of said tongues, said plate having sufficient resiliency to permit its being sprung downwardly within the area between said feet to effect the interlocked engagement of the tongues with the aperture or to disengage said tongues from the apertures.

3. A pillow block according to claim 1 wherein the yoke consists of a metallic strap of inverted substantially U-shaped form, and the side edge portions of such strap are turned under and inwardly with their confronting terminal edges in relatively spaced relation to form the groove for receiving said flanges.

JOHN TURE RUIST.

References Cited in the file of this patent

UNITED STATES PATENTS

| Number | Name | Date |
|---|---|---|
| 1,873,086 | Watts | Aug. 23, 1932 |
| 2,157,098 | Potter | May 9, 1939 |
| 2,467,994 | Ruist | Apr. 19, 1949 |